(12) United States Patent
Turley et al.

(10) Patent No.: US 7,610,621 B2
(45) Date of Patent: Oct. 27, 2009

(54) SYSTEM AND METHOD FOR BEHAVIOR-BASED FIREWALL MODELING

(75) Inventors: Patrick Turley, Austin, TX (US); Eric White, 1717 Bartoncliff Dr., Austin, TX (US) 78704

(73) Assignee: Eric White, Austin, TX (US)

( * ) Notice: Subject to any disclaimer, the term of this patent is extended or adjusted under 35 U.S.C. 154(b) by 763 days.

(21) Appl. No.: 11/076,719

(22) Filed: Mar. 10, 2005

(65) Prior Publication Data

US 2005/0204402 A1 Sep. 15, 2005

Related U.S. Application Data

(60) Provisional application No. 60/551,698, filed on Mar. 10, 2004.

(51) Int. Cl.
*H04L 29/00* (2006.01)
(52) U.S. Cl. .......................................................... 726/11
(58) Field of Classification Search ........................ None
See application file for complete search history.

(56) References Cited

U.S. PATENT DOCUMENTS

| | | |
|---|---|---|
| 5,673,393 A | 9/1997 | Marshall et al. |
| 5,706,427 A | 1/1998 | Tabuki |
| 5,748,901 A | 5/1998 | Afek et al. |
| 5,878,231 A | 3/1999 | Baehr et al. |
| 5,896,499 A | 4/1999 | McKelvey |
| 5,901,148 A | 5/1999 | Bowen et al. |
| 5,936,542 A | 8/1999 | Kleinrock et al. |
| 5,953,506 A | 9/1999 | Kalra et al. |
| 5,987,134 A | 11/1999 | Shin et al. |
| 5,996,013 A | 11/1999 | Delp et al. |
| 6,085,241 A | 7/2000 | Otis |
| 6,088,451 A | 7/2000 | He et al. |
| 6,092,200 A | 7/2000 | Muniyappa et al. |
| 6,108,782 A | 8/2000 | Fletcher et al. |
| 6,130,892 A | 10/2000 | Short et al. |
| 6,131,116 A | 10/2000 | Riggins et al. |

(Continued)

FOREIGN PATENT DOCUMENTS

EP 0587522 B1 1/2000

(Continued)

OTHER PUBLICATIONS

Rashti et al., A Multi-Dimensional Packet Classifier for NP-Based Firewalls, Jan. 2004, Retrieved from the Internet on Aug. 12, 2009: <URL: http://ieeexplore.ieee.org/stamp/stamp.jsp?tp= &arnumber=1266123&isnumber=28312>.*

(Continued)

*Primary Examiner*—Minh Dinh
(74) *Attorney, Agent, or Firm*—Sprinkle IP Law Group

(57) ABSTRACT

One embodiment of the present invention creates a model of the traffic through a network firewall and uses that model to dynamically manipulate the network firewall based on human intervention or based on the automatic invocations of processes and protocols that implement firewall policy. Another embodiment of the invention creates a model of the physical and virtual network interfaces that a firewall system controls and presents abstracted entities representing both the interface abstractions and the processing nodes (network segments or network client devices) to and through which network traffic flows.

20 Claims, 3 Drawing Sheets

U.S. PATENT DOCUMENTS

| | | | |
|---|---|---|---|
| 6,157,953 | A | 12/2000 | Chang et al. |
| 6,173,331 | B1 | 1/2001 | Shimonishi |
| 6,176,883 | B1 | 1/2001 | Holloway et al. |
| 6,185,567 | B1 | 2/2001 | Ratnaraj et al. |
| 6,194,992 | B1 | 2/2001 | Short et al. |
| 6,199,113 | B1 | 3/2001 | Alegre et al. |
| 6,205,552 | B1 | 3/2001 | Fudge |
| 6,212,558 | B1 | 4/2001 | Antur et al. |
| 6,219,706 | B1 | 4/2001 | Fan |
| 6,233,607 | B1 | 5/2001 | Taylor et al. |
| 6,243,815 | B1 | 6/2001 | Antur et al. |
| 6,275,693 | B1 | 8/2001 | Lin et al. |
| 6,295,294 | B1 | 9/2001 | Odlyzko |
| 6,321,339 | B1 | 11/2001 | French et al. |
| 6,324,648 | B1 | 11/2001 | Grantges, Jr. |
| 6,336,133 | B1 | 1/2002 | Morris et al. |
| 6,404,743 | B1 | 6/2002 | Meandzija |
| 6,421,319 | B1 | 7/2002 | Iwasaki |
| 6,463,474 | B1 | 10/2002 | Fuh et al. |
| 6,473,793 | B1 | 10/2002 | Dillon et al. |
| 6,473,801 | B1 | 10/2002 | Basel |
| 6,477,143 | B1 | 11/2002 | Ginossar |
| 6,502,131 | B1 | 12/2002 | Vaid et al. |
| 6,516,417 | B1 | 2/2003 | Pegrum et al. |
| 6,535,879 | B1 | 3/2003 | Behera |
| 6,539,431 | B1 | 3/2003 | Sitaraman et al. |
| 6,636,894 | B1 | 10/2003 | Short et al. |
| 6,678,733 | B1 | 1/2004 | Brown et al. |
| 6,708,212 | B2 | 3/2004 | Porras et al. |
| 6,732,179 | B1 | 5/2004 | Brown et al. |
| 6,735,691 | B1 | 5/2004 | Capps et al. |
| 6,757,740 | B1 | 6/2004 | Parekh et al. |
| 6,785,252 | B1 | 8/2004 | Zimmerman et al. |
| 6,789,110 | B1 | 9/2004 | Short et al. |
| 6,804,783 | B1 | 10/2004 | Wesinger et al. |
| 6,823,385 | B2 | 11/2004 | McKinnon et al. |
| 6,917,622 | B2 | 7/2005 | McKinnon et al. |
| 7,013,331 | B2 | 3/2006 | Das |
| 7,120,934 | B2 | 10/2006 | Ishikawa |
| 7,143,283 | B1 * | 11/2006 | Chen et al. ............... 713/153 |
| 7,146,639 | B2 * | 12/2006 | Bartal et al. ............... 726/11 |
| 7,181,017 | B1 | 2/2007 | Nagel et al. |
| 7,185,368 | B2 | 2/2007 | Copeland, III |
| 7,266,754 | B2 | 9/2007 | Shah et al. |
| 7,272,646 | B2 | 9/2007 | Cooper |
| 7,324,947 | B2 | 1/2008 | Jordan et al. |
| 7,325,042 | B1 | 1/2008 | Soscia et al. |
| 7,406,530 | B2 | 7/2008 | Brown et al. |
| 7,420,956 | B2 | 9/2008 | Karaoguz et al. |
| 7,509,625 | B2 | 3/2009 | Johnston et al. |
| 2001/0038639 | A1 | 11/2001 | McKinnon et al. |
| 2001/0038640 | A1 | 11/2001 | McKinnon et al. |
| 2001/0038645 | A1 | 11/2001 | McKinnon et al. |
| 2001/0039576 | A1 | 11/2001 | Kanada |
| 2001/0039582 | A1 | 11/2001 | McKinnon et al. |
| 2002/0013844 | A1 | 1/2002 | Garrett et al. |
| 2002/0021665 | A1 | 2/2002 | Bhagavath et al. |
| 2002/0023160 | A1 | 2/2002 | Garrett et al. |
| 2002/0029260 | A1 | 3/2002 | Dobbins et al. |
| 2002/0035699 | A1 | 3/2002 | Crosbie |
| 2002/0042883 | A1 | 4/2002 | Roux et al. |
| 2002/0046264 | A1 | 4/2002 | Dillon et al. |
| 2002/0052950 | A1 | 5/2002 | Pillai et al. |
| 2002/0055968 | A1 | 5/2002 | Wishoff et al. |
| 2002/0059408 | A1 | 5/2002 | Pattabhiraman et al. |
| 2002/0075844 | A1 | 6/2002 | Hagen |
| 2002/0085719 | A1 | 7/2002 | Crosbie |
| 2002/0087713 | A1 | 7/2002 | Cunningham |
| 2002/0090089 | A1 | 7/2002 | Branigan et al. |
| 2002/0091944 | A1 | 7/2002 | Anderson et al. |
| 2002/0112183 | A1 | 8/2002 | Baird, III et al. |
| 2002/0112186 | A1 | 8/2002 | Ford et al. |
| 2002/0120741 | A1 | 8/2002 | Webb et al. |
| 2002/0123335 | A1 | 9/2002 | Luna et al. |
| 2002/0124078 | A1 | 9/2002 | Conrad |
| 2002/0124103 | A1 | 9/2002 | Maruyama et al. |
| 2002/0129143 | A1 | 9/2002 | McKinnon, III et al. |
| 2002/0131404 | A1 | 9/2002 | Mehta et al. |
| 2002/0133581 | A1 | 9/2002 | Schwartz et al. |
| 2002/0133589 | A1 | 9/2002 | Gubbi et al. |
| 2002/0136226 | A1 | 9/2002 | Christoffel et al. |
| 2002/0138762 | A1 | 9/2002 | Horne |
| 2002/0138763 | A1 | 9/2002 | Delany et al. |
| 2002/0143964 | A1 | 10/2002 | Guo et al. |
| 2002/0152284 | A1 | 10/2002 | Cambray et al. |
| 2002/0162030 | A1 | 10/2002 | Brezak et al. |
| 2002/0164952 | A1 | 11/2002 | Singhai et al. |
| 2002/0165990 | A1 | 11/2002 | Singhai et al. |
| 2002/0169867 | A1 | 11/2002 | Mann et al. |
| 2002/0174227 | A1 | 11/2002 | Hartsell et al. |
| 2002/0178282 | A1 | 11/2002 | Mysore et al. |
| 2002/0199007 | A1 | 12/2002 | Clayton et al. |
| 2003/0041104 | A1 | 2/2003 | Wingard et al. |
| 2003/0043846 | A1 | 3/2003 | Purpura et al. |
| 2003/0046370 | A1 | 3/2003 | Courtney |
| 2003/0055994 | A1 | 3/2003 | Herrmann et al. |
| 2003/0059038 | A1 | 3/2003 | Meyerson et al. |
| 2003/0061506 | A1 | 3/2003 | Cooper et al. |
| 2003/0069956 | A1 | 4/2003 | Gieseke et al. |
| 2003/0070170 | A1 | 4/2003 | Lennon |
| 2003/0078784 | A1 | 4/2003 | Jordan et al. |
| 2003/0087629 | A1 | 5/2003 | Juitt et al. |
| 2003/0126608 | A1 | 7/2003 | Safadi et al. |
| 2003/0135753 | A1 | 7/2003 | Batra et al. |
| 2003/0149751 | A1 | 8/2003 | Bellinger et al. |
| 2003/0154399 | A1 | 8/2003 | Zuk et al. |
| 2003/0159072 | A1 | 8/2003 | Bellinger et al. |
| 2003/0163063 | A1 | 8/2003 | Fry et al. |
| 2003/0172167 | A1 | 9/2003 | Judge et al. |
| 2003/0177477 | A1 | 9/2003 | Fuchs |
| 2003/0212800 | A1 | 11/2003 | Jones et al. |
| 2003/0217126 | A1 | 11/2003 | Polcha et al. |
| 2004/0015719 | A1 | 1/2004 | Lee et al. |
| 2004/0047356 | A1 | 3/2004 | Bauer |
| 2004/0049586 | A1 | 3/2004 | Ocepek et al. |
| 2004/0064836 | A1 | 4/2004 | Ludvig et al. |
| 2004/0073941 | A1 | 4/2004 | Ludvig et al. |
| 2004/0085906 | A1 | 5/2004 | Ohtani et al. |
| 2004/0093513 | A1 | 5/2004 | Cantrell et al. |
| 2004/0103426 | A1 | 5/2004 | Ludvig et al. |
| 2004/0122956 | A1 | 6/2004 | Myers et al. |
| 2004/0172557 | A1 | 9/2004 | Nakae et al. |
| 2004/0177276 | A1 | 9/2004 | MacKinnon et al. |
| 2004/0179822 | A1 | 9/2004 | Tsumagari et al. |
| 2004/0181816 | A1 | 9/2004 | Kim et al. |
| 2004/0199635 | A1 | 10/2004 | Ta et al. |
| 2004/0210633 | A1 | 10/2004 | Brown et al. |
| 2004/0268234 | A1 | 12/2004 | Sampathkumar et al. |
| 2005/0021686 | A1 | 1/2005 | Jai et al. |
| 2005/0044350 | A1 | 2/2005 | White et al. |
| 2005/0044422 | A1 | 2/2005 | Cantrell et al. |
| 2005/0091303 | A1 | 4/2005 | Suzuki |
| 2005/0138416 | A1 * | 6/2005 | Qian et al. ............... 713/201 |
| 2005/0149721 | A1 | 7/2005 | Lu et al. |
| 2005/0193103 | A1 | 9/2005 | Drabik |
| 2005/0195854 | A1 | 9/2005 | Agmon et al. |
| 2005/0204022 | A1 | 9/2005 | Johnston et al. |
| 2005/0204031 | A1 | 9/2005 | Johnston et al. |
| 2005/0204050 | A1 | 9/2005 | Turley |
| 2005/0204168 | A1 | 9/2005 | Johnston et al. |
| 2005/0204169 | A1 | 9/2005 | Tonnesen |
| 2006/0036723 | A1 | 2/2006 | Yip et al. |
| 2006/0168229 | A1 | 7/2006 | Shim et al. |
| 2006/0173992 | A1 | 8/2006 | Weber et al. |

| | | | |
|---|---|---|---|
| 2006/0184618 | A1 | 8/2006 | Kurup et al. |
| 2007/0073718 | A1 | 3/2007 | Ramer et al. |
| 2007/0186113 | A1 | 8/2007 | Cuberson et al. |
| 2007/0208936 | A1 | 9/2007 | Robles |
| 2007/0268878 | A1 | 11/2007 | Clements |
| 2008/0066096 | A1 | 3/2008 | Wollmershauser et al. |
| 2008/0120661 | A1 | 5/2008 | Ludvig et al. |
| 2008/0147840 | A1 | 6/2008 | Roelens et al. |
| 2008/0276305 | A1 | 11/2008 | Chan et al. |

FOREIGN PATENT DOCUMENTS

| | | | |
|---|---|---|---|
| WO | WO 01/77787 A3 | 10/2001 | |
| WO | WO 02/09458 A2 | 1/2002 | |
| WO | WO 02/23825 A1 | 3/2002 | |
| WO | WO 02/41587 A2 | 5/2002 | |
| WO | WO 02/077820 A1 | 10/2002 | |
| WO | WO 03/021890 A1 | 3/2003 | |
| WO | WO 03/098461 A1 | 5/2003 | |
| WO | WO 2004/034229 A2 | 4/2004 | |
| WO | WO 2004/036371 A2 | 4/2004 | |
| WO | WO 2005/020035 A2 | 3/2005 | |

OTHER PUBLICATIONS

U.S. Patent Office Official Action issued Jul. 13, 2007 in U.S. Appl. No. 10/922,041, Eric White.
U.S. Patent Office Action issued Aug. 13, 2008, in U.S. Appl. No. 11/076,591, Patrick Turley, 10 pages.
U.S. Patent Office Action issued Jul. 22, 2008, in U.S. Appl. No. 11/076,652, Steven D. Tonnesen, 8 pages.
U.S. Patent Office Official Action issued Oct. 9, 2007 in U.S. Appl. No. 10/683,317, Richard MacKinnon.
U.S. Patent Office Official Action issued Oct. 18, 2007 in U.S. Appl. No. 10/687,002, Tuan Ta.
U.S. Patent Office Official Action issued Oct. 31, 2007 in U.S. Appl. No. 11/078,223, Keith Johnston.
U.S. Patent Office Action issued Jan. 25, 2008, in U.S. Appl. No. 11/076,652, Steven D. Tonnesen, 16 pages.
U.S. Patent Office Action issued Apr. 17, 2008, in U.S. Appl. No. 10/687,002, Tuan Ta, 13 pages.
U.S. Appl. No. 08/816,174, Short et al.
U.S. Appl. No. 09/458,569, Short et al.
U.S. Appl. No. 09/458,602, Pagan et al.
U.S. Appl. No. 09/541,877, Short et al.
U.S. Appl. No. 09/821,565, Ishikawa.
U.S. Appl. No. 09/881,147, Cooper et al.
U.S. Appl. No. 10/000,396, Copeland.
U.S. Appl. No. 10/072,683, Zuk et al.
U.S. Appl. No. 10/195,326, Lee et al.
U.S. Appl. No. 10/236,402, Bauer.
U.S. Appl. No. 10/291,095, Cantrell et al.
U.S. Appl. No. 10/469,206, Ohtani et al.
U.S. Appl. No. 10/641,494, Valluri.
U.S. Appl. No. 10/643,864, Nakae et al.
U.S. Appl. No. 10/709,423, Lu et al.
U.S. Appl. No. 10/930,392, Cantrell et al.
U.S. Appl. No. 10/930,922, Cantrell et al.
U.S. Appl. No. 10/953,326, Suzuki.
U.S. Patent Office Action issued Jun. 9, 2008, in U.S. Appl. No. 10/683,317, Richard MacKinnon, 15 pages.
Fan et al, "Distributed Real Time Intrusion Detection System for 3G", 2004, pp. 1566-1570.
Yu et al., "Fuzzy Logic Based Adaptive Congestion Control Scheme for High-Speed Network", Aug. 2004, pp. 389-393.
Hamano et al., A Redirections-Based Defense Mechanism Against Flood-Type Attacks in Large Scale ISP Networks, 2004, pp. 543-547.
Sarolahti, "Congestion Control on Spurious TCP Retransmssion Timeouts," 2003, pp. 682-686.
Estevez-Tapiador et al., "Measuring Normality in HTTP Traffic for Anomaly-Based Intrusion Detection", Jun. 6, 2004, pp. 175-193.
Xing et al., "A Survery of Computer Vulnerability Assessment", Jan. 2004, pp. 1-11.

Wen et al. "Development of a Snort-Based Security Network Management and Real-Time Intrusion Detection System", Feb. 2004, pp. 40-43.
Thottethodi et al., "Exploiting Global Knowledge to Achieve Self-Tuned Congestion Control for K-ary n-cube Networks", Mar. 2004, pp. 257-272.
Trabelsi et al., "Malicious Sniffing Systems Detection Platform", 2004, pp. 201-207.
Guangzhi et al., "A Framework for Network Vulnerability Analysis", 2002, pp. 289-294.
Albuquerque et al., "Network Border Patrol: Preventing Congestion Collapse and Promoting Fairness in the Internet", Feb. 2004, pp. 173-186.
Wirbel, Loring, "Security Stampede Could Flatten IPSec", Jan. 2004, p. 12.
Macleod, Calum, "Freeing the Shackles with Secure Remote Working", 2003, pp. 66-67.
Fisher, D., "SSL Simplifies VPN Security", Nov. 10, 2003, p. 40.
Conry-Murray, A., "SSL VPNs: Remote Access for the Masses", Oct. 2003, pp. 26-32.
Permeo Supports Microsoft Network Access Protection for Simplified Secure Remote Access; Permeo's Base5 Support for Microsoft Tech. Provides "Zero Touch" Policy Enforcement.
No author, Permeo Drives Out Operational Costs, Simplifies Secure Remote Access, Mar. 28, 2005, pp. NA.
No author, Netilla Lauches SSL VPN for Citrix. (Industry Briefs) (Virtual Private Networks) (Brief Article), Sep. 20, 2004, p. 43.
Netilla Lauches Secure Gateway Appliance Family of Application-Specific SSL VPN Products; Initial SGA-C Model Provides Secure Remote Access to Citrix MetaFrame Presentation.
No author, "Secure Remote Access (Network Security) (VPN Gateway 4400 Series) (Brief Article)", Mar. 1, 2004, p. 50.
Fortinet and Aventail Deliver Joint Solution for Clientless Remote Access with High-Performance Antivirus Protection; Integrated SSL VPN and Antivirus Offering Provides.
Hamblen, Matt, "Cisco Targets SSL VPN Vendors, Adds Support for Clientless Security Protoccol: Installed Base of VPN Devices May Give it an Edge, Despite Late Entry (News)".
International Search Report and Written Opinion for related International Application No. PCT/US04/29249, Dec. 15, 2005.
Stone, David, "Securing Wireless LANs with VPN," May 2006, pp. NA.
Hamzeh, et al., "Point-to-Point Tunneling Protocol—PPTP RFC 2637" Network Working Group, Jul. 1999, pp. 1-54.
Pfleeger, Charles P., Security in Computing, PTR Prentice-Hall, Inc., 1989, Ch. 10.
International Search Report for PCT/US03/32912, Apr. 8, 2004.
Lingblom, "Cranite Develops SMB Strategy," CRN, San Jose, CA, Jun. 23, 2003.
"Boingo Wireless Service Installed at LaGuardia Airport" Copyright 2003 M2Communications Ltd., found at www.findarticles.com, Dec. 8, 2003, 1 page.
West Point Unwired: the Military Academy at West Point Continues to Lead the Way in High-Tech Curriculum with Wireless Classroom Networking Copyright 2003 M2Communications.
Molta, "Wireless Hotspots Heat Up," Mobile & Wireless Technology feature, pp. 1-8, Copyright 2003 M2Communications Ltd., found at www.networkcomputing.com, printed Dec. 8, 2003.
Jackson, "Wireless at West Point: Officers of the Future Use IT in Class Now, in the Field Later (Technology Report)" Apr. 21, 2003, pp. 1-3, www.gcn.com.
Lingblom, "Bluesocket's New Gateway Based on Open Standards—WGX-4000 Switch Wireless Gateway" CRN, Burlington, MA at www.crn.channelsupersearch.com, Apr. 21, 2003.
Dornan, "Wireless LANs: Freedom vs. Security?" Network Magazine, Jul. 2005, pp. 36-39.
O'Shea, "PCTEL looks past patent suite toward fusion of Wi-Fi, PC" Telephony.online, Jun. 2, 2003, pp. 1-2, found at www.telephonyonline.com.
O'Shea, "Boingo to Launch Initiative Aimed at Carrier Market" Telephony.online, Mar. 10, 2003, 1 page, found at www.telephonyonline.com.

International Search Report from PCT/US03/32268 dated Oct. 29, 2004.

U.S. Patent Office Action issued Jul. 9, 2008, in U.S. Appl. No. 11/076,672, Keith Johnston, 12 pages.

Office Action issued in U.S. Appl. No. 11/076,652 dated Dec. 11, 2008, Tonnesen, 8 pages.

Office Action issued in U.S. Appl. No. 10/687,002 dated Jan. 7, 2009, Ta, 4 pages.

SBC Technology Resources, Inc., XNMP-XML Network Management Protocol and Interface, Jul. 19, 2002, pp. 1-9, http://www.ietf.org/proceedings/02jul/slides.

Shim, Choon B., XNMP for IP Telephony Management, Enterprise Networks & Servers, Jun. 2006, pp. 1-7, http://www.enterprisenetworksandservers.com.

Oh et al., Interaction Translation Methods for XML/SNMP Gateway, Jul. 11, 2003, retrieved from . . . http://web-archive.org/web/20030711162412/http://dpnm.postech.ac.kr/papers/DSOM/02/xml-snmp-gateway/xml-snmp-gateway.pdf, pp. 1-5.

Office Action issued in U.S. Appl. No. 11/076,672 dated Feb. 3, 2009, Johnston, 10 pages.

Office Action issued in U.S. Appl. No. 10/683,317 dated Feb. 11, 2009, MacKinnon, 17 pages.

Office Action issued in U.S. Appl. No. 11/076,591 dated Feb. 13, 2009, Turley, 26 pages.

International Preliminary Report on Patentability in PCT/US03/032268, 3 pages , dated Jan. 4, 2005.

International Preliminary Report on Patentability in PCT/US03/032912, 3 pages , dated Jun. 28, 2004.

International Preliminary Report on Patentability and Written Opinion of the International Searching Authority in PCT/US04/029249 dated Feb. 21, 2006, 6 pages.

Crandell et al., "A Secure and Transparent Firewall Web Proxy," Oct. 2003, USENIX, Retrieved from the internet on Jul. 15, 2009: <URL: http://www.usenix.org/event/lisa03/tech/full_papers/crandell/crandell.pdf>.

Sommerlad, "Reverse Proxy Patterns," 2003 Retrieved from the Internet on Jul. 15, 2009: <URL: http://www.modsecurity.org/archive/ReverseProxy-book-1.pdf>.

U.S. Patent and Trademark Office, Notice of Allowability issued in U.S. Appl. No. 11/076,646, mailed Jul. 24, 2009, Johnston et al., 7 pages.

U.S. Patent and Trademark Office, Office Action issued in U.S. Appl. No. 11/076,591, mailed Aug. 6, 2009, Turley et al., 29 pages.

U.S. Patent and Trademark Office, Office Action issued in U.S. Appl. No. 11/076,672, mailed Jul. 21, 2009, White, 11 Pages.

Office Action issued in U.S. Appl. No. 10/922,041, mailed Dec. 6, 2005, White, 10 pages.

Office Action issued in U.S. Appl. No. 10/922,041, mailed Mar. 30, 2006, White, 18 pages.

Office Action issued in U.S. Appl. No. 10/922,041, mailed Aug. 11, 2006, White, 19 pages.

Office Action issued in U.S. Appl. No. 10/922,041, mailed Jan. 30, 2007, White, 20 pages.

Office Action issued in U.S. Appl. No. 10/683,317, mailed Apr. 5, 2007, MacKinnon, 6 pages.

Office Action issued in U.S. Appl. No. 10/687,002, mailed May 2, 2007, Ta, 10 pages.

Office Action issued in U.S. Appl. No. 10/922,041, mailed May 8, 2009, White, 43 pages.

Office Action issued in U.S. Appl. No. 10/683,317, mailed Aug. 18, 2009, 17 pages.

* cited by examiner

SYSTEM AND METHOD FOR BEHAVIOR-BASED FIREWALL MODELING

RELATED APPLICATIONS

This application claims priority under 35 U.S.C. 119(e) to U.S. Provisional Patent Application No. 60/551,698, filed Mar. 10, 2004, entitled "SYSTEM AND METHOD FOR BEHAVIOR-BASED FIREWALL MODELING," to Patrick Turley, which is hereby fully incorporated by reference herein.

This application is also related to U.S. patent application Ser. No. 10/683,317, filed Oct. 10, 2003 entitled "SYSTEM AND METHOD FOR PROVIDING ACCESS CONTROL," by Richard MacKinnon, Kelly Looney, and Eric White, and U.S. Provisional Patent Application No. 60/551,703, entitled "SYSTEM AND METHOD FOR PROVIDING A CENTRALIZED DESCRIPTION/CONFIGURATION OF CLIENT DEVICES ON A NETWORK ACCESS GATEWAY," by Patrick Turley and Keith Johnston, filed Mar. 10, 2004 which are hereby fully incorporated by reference herein.

TECHNICAL FIELD OF THE INVENTION

Embodiments of the present invention relate generally to network firewall designs and methodologies and more specifically to network firewalls that can dynamically adapt to changing conditions and operator requirements.

BACKGROUND

The communication of data over networks has become an important, if not essential, way for many organizations and individuals to communicate. The Internet is a global network connecting millions of computers using a client-server architecture in which any computer connected to the Internet can potentially receive data from and send data to any other computer connected to the Internet. The Internet provides a variety of methods in which to communicate data, one of the most ubiquitous of which is the World Wide Web. Other methods for communicating data over the Internet include e-mail, usenet newsgroups, telnet and FTP.

Users typically access the Internet either through a computer connected to an Internet Service Provider ("ISP") or computer connected to a local area network ("LAN") provided by an organization, which is in turn connected to an ISP. The network service provider provides a point of presence to interface with the Internet backbone. Routers and switches in the backbone direct data traffic between the various ISPs.

As the number of networked devices has increased, so too has the amount and nature of network traffic. One unfortunate side effect is the evolution of destructive or unauthorized access to the data or operations of networked devices. As a result, technological advances have produced a general class of network service known as a "firewall", which can block or limit access to computers, networks and services "inside" the firewall, from access by any network devices "outside" the firewall. Representation of "inside" and "outside" a firewall is analogous to physical security and protection, where something "inside" is protected from something "outside". Hence, firewall technology and services normally have one network interface connected to the general internet or an unprotected segment of any network and the protected computer and network assets are located behind another network interface controlled by the firewall that is a different, protected network segment.

Typically, network firewalls are configured in a static manner, wherein the firewall's configuration is established and changes infrequently.

Firewalls are potentially complicated structures that are generally maintained manually by a skilled professional. Firewall owners must therefore limit themselves to simple and inflexible features provided by typical network applications/devices, or they must invest in professionals who are skilled enough to construct and maintain firewalls to their specifications. In other words, the skilled firewall professional provides the intelligence, decision-making and flexibility that is lacking in static firewall technology.

Previous firewall implementations are typically limited in two ways: (1) they are embedded in an inflexible hardware platform with no ability to expand and/or (2) they offer only a very simple set of user-visible features both because they have no expandability and because they lack the conceptual model to express more advanced features in a way that is convenient for customers to use. These solutions are inadequate because they limit the power of the features available to customers.

While statically configured firewalls serve a purpose for protecting static network and computing assets, the ability to dynamically reconfigure firewalls in a changing network environment represents a significant evolutionary step in network firewall technology. Dynamic firewalls can monitor transient network client connections and adjust themselves to optimally serve and protect a dynamically changing network client population on both "sides" of a firewall.

SUMMARY OF THE INVENTION

Embodiments of the current invention expose a conceptual model of firewall structure that makes it far easier to construct an automated system to bridge the gap between the desires of users and the technical implementation of those desires.

One embodiment of the current invention provides a new level of flexibility including, but not limited to, dynamically adding new network interface abstractions or groupings of interface abstractions and tailoring the behavior of those abstractions to the network client devices' specific needs. The embodiment enables the firewall owner to generally describe how the firewall should behave, and the invention can automatically produce the requisite, specific firewall configuration, without detailed manipulation by a human operator.

In one embodiment, this invention models sources and destinations of network traffic (e.g., client, Virtual Private Network, and Wide Area Network-side devices) as "nodes" that exhibit particular sets of behaviors. Network interface devices (including virtual devices) can then be associated with one of the nodes and assigned the same behaviors/rules as all other devices in that particular node. In this way, the data flows between devices can be monitored and controlled according to the behaviors and rules of each device.

Another embodiment of this invention extends the aforementioned behavior description and configuration to modeling the connections between nodes and not just the devices (virtual or physical) of a particular node. That is to say, not only do the devices belonging to a node exhibit particular behaviors, but the connections between each node also exhibit particular behaviors.

Another embodiment of the current invention defines a conceptual framework of the firewall and elucidates the flow of traffic through the gateway and provides a level of abstraction that can be understood and manipulated by human operators to tailor the system's behaviors to their needs.

Another embodiment of the current invention enables the firewall to react dynamically to important changes such as, but not limited to, the addition or removal of physical or virtual network interfaces. This can be especially important for certain applications because the invention permits the deployment of unsophisticated, general implementation technologies (i.e., off-the-shelf hardware) and does not require a custom hardware platform.

BRIEF DESCRIPTION OF THE DRAWINGS

A more complete understanding of the present invention and the advantages thereof may be acquired by referring to the following description, taken in conjunction with the accompanying drawings in which like reference indicates like features and wherein.

DETAILED DESCRIPTION

Figure 1:
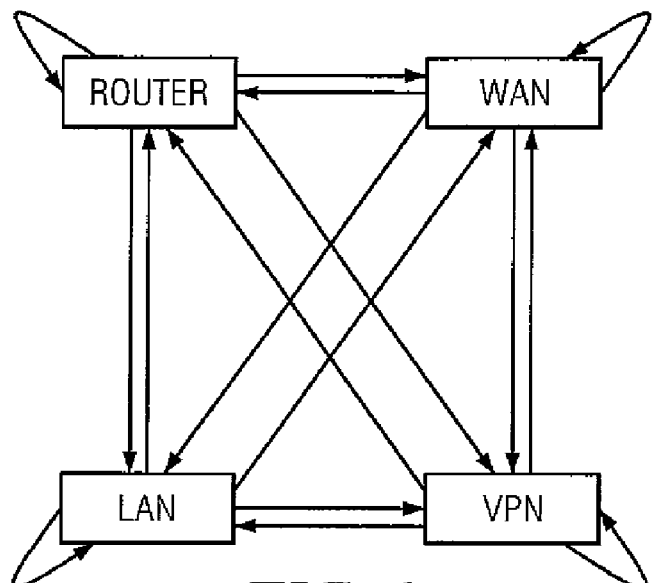
FIG. 1 illustrates a set of nodes for a firewall model.

The following applications are hereby fully incorporated by reference herein in their entirety: U.S. application Ser. No. 10/683,317, filed Oct. 10, 2003 entitled "SYSTEM AND METHOD FOR PROVIDING ACCESS CONTROL," by Richard MacKinnon, Kelly Looney, and Eric White; U.S. Provisional Application No. 60/551,698, filed Mar. 10, 2004 entitled "SYSTEM AND METHOD FOR BEHAVIOR-BASED FIREWALL MODELING," by Patrick Turley; U.S. Provisional Application No. 60/551,754, filed Mar. 10, 2004 entitled "SYSTEM AND METHOD FOR COMPREHENSIVE CODE GENERATION FOR SYSTEM MANAGEMENT," by Keith Johnston which converted into U.S. application Ser. No. 11/078,223, filed Mar. 10, 2005 entitled "SYSTEM AND METHOD FOR COMPREHENSIVE CODE GENERATION FOR SYSTEM MANAGEMENT," by Keith Johnston; U.S. Provisional Application No. 60/551,703, filed Mar. 10, 2004 entitled "SYSTEM AND METHOD FOR PROVIDING A CENTRALIZED DESCRIPTION/ CONFIGURATION OF CLIENT DEVICES ON A NETWORK ACCESS GATEWAY," by Patrick Turley and Keith Johnston; U.S. Provisional Application No. 60/551,702, filed Mar. 10, 2004 entitled "SYSTEM AND METHOD FOR ACCESS SCOPE CONTROL ("WALLED GARDENS") FOR CLIENTS OF A NETWORK ACCESS GATEWAY," by Patrick Turley, Keith Johnston, and Steven D. Tonnesen which converted into U.S. application Ser. No. 11/076,591, filed Mar. 10, 2005 entitled "METHOD AND SYSTEM FOR CONTROLLING NETWORK ACCESS," by Patrick Turley, Keith Johnston, and Steven D. Tonnesen; U.S. Provisional Application No. 60/551,699, filed Mar. 10, 2004 entitled "SYSTEM AND METHOD FOR DYNAMIC BANDWIDTH CONTROL," by Patrick Turley, et al.; U.S. Provisional Application No. 60/551,697, filed Mar. 10, 2004 entitled "SYSTEM AND METHOD FOR DETECTION OF ABERRANT NETWORK BEHAVIOR BY CLIENTS OF A NETWORK ACCESS GATEWAY," by Steven D. Tonnesen which converted into U.S. application Ser. No. 11/076,652, filed Mar. 10, 2005 entitled "SYSTEM AND METHOD FOR DETECTION OF ABERRANT NETWORK BEHAVIOR BY CLIENTS OF A NETWORK ACCESS GATEWAY," by Steven D. Tonnesen; U.S. Provisional Application No. 60/551,705, filed Mar. 10, 2004 entitled "SYSTEM AND METHOD FOR DOUBLE-CAPTURE/DOUBLE-REDIRECT TO A DIFFERENT LOCATION," by Keith Johnston, et al. which converted into U.S. application Ser. No. 11/076, 646, filed Mar. 10, 2005 entitled "SYSTEM AND METHOD FOR DOUBLE-CAPTURE/DOUBLE-REDIRECT TO A DIFFERENT LOCATION," by Keith Johnston, et al.; U.S. Provisional Application No. 60/551,704, filed Mar. 10, 2004 entitled "SYSTEM AND METHOD FOR NETWORK MANAGEMENT XML ARCHITECTURAL ABSTRACTION," by Keith Johnston and Mario Garcia which converted into U.S. application Ser. No. 11/076,672, filed Mar. 10, 2005 entitled "SYSTEM AND METHOD FOR NETWORK MANAGEMENT XML ARCHITECTURAL ABSTRACTION," by Keith Johnston and Mario Garcia; and U.S. Provisional Application No. 60/551,703, filed Mar. 10, 2005 entitled "SYSTEM AND METHOD FOR PROVIDING A CENTRALIZED DESCRIPTION/CONFIGURATION OF CLIENT DEVICES ON A NETWORK ACCESS GATEWORK," by Patrick Turley, et al.

The present invention described herein considers the firewall as implemented within a device, service or server at the nexus of two network segments but, at a conceptual level, it appears more like any other network traffic origination or destination device; i.e., while the functional aspects of a firewall may differentiate itself from other network infrastructure devices or services, at a conceptual level it inspects, marks, prioritizes and routes traffic similar to other network packet handling service.

Embodiments of this invention seek to abstract the diverse set of network and firewall operations into a generalization of activities amongst "nodes" in the firewall model. With a basic conceptual model, all firewall behavior can be characterized as high-level operations on network traffic flowing through the firewall.

The firewall is the nexus in a fully-interconnected graph (FIG. 1) with four nodes. Each node in FIG. 1 is simultaneously a source of and destination for network packets. Packets travel between nodes over intra-firewall connections within the firewall model. Implementations of intra-firewall connections can be software, in-memory implementations or can be hardware, signaling implementations. A non-limiting example of a software, in-memory implementation can be realized through a computer program product comprising a computer readable storage medium storing computer program code executable b a computer. As one of ordinary skill in the art can appreciate a computer memory is a non-limiting example of a computer readable storage medium.

There are three essential stages to a packet's journey through the firewall model:

Arriving, node-specific behaviors. Where network traffic is inspected upon arrival at a node in the firewall model and the model acts upon this traffic, based on its configuration at the time of the traffic arrival and the processing node's capabilities.

Connection-specific behaviors. Some behaviors are contextually important when considered as part of a connection between two nodes in the firewall model. When network traffic flows over the connection it can be inspected and handled at one or both of the node endpoints of the connection.

Departing, node-specific behaviors. Where network traffic is inspected prior to departure from a node and the firewall acts upon this traffic, based on its configuration at the time of the traffic departure and the processing node's capabilities.

Embodiments of this invention employ existing operating system mechanisms to implement the concepts. For example. The Linux operating system has a subsystem known as "iptables" (for Internet Protocol Tables) that offers a "rule" syntax for representing the logic of packet handling through the Linux system.

As illustrated in FIG. 2, and described below, The firewall employs dynamic chains of rules (serialized sequences of one or more rules) to "tap" into the main firewall chains and offer isolated, well-defined places for specific behavior to be introduced. One reason for functional extensions is to enrich the firewall rule predicate or antecedent functionality to provide more functionality as domain-specific applications require or as general network technology evolves.

To dynamically integrate devices or interfaces, the firewall defines the following objects:

Device—Represents a source or sink of network traffic. In the firewall conceptual framework, a "device" can be mapped to a physical device or network interface, or it can be mapped to a virtual device; e.g., a virtual private network (VPN) is an abstraction of routes, keys and permissions that represent a virtual network segment, the firewall can manipulate the facets of a VPN through a VPN device in the firewall abstraction nomenclature. Devices always belong to nodes when they are active.

Chain—Represents a list of one or more firewall rules. A firewall rule has the normal predicate/antecedent format, where elements of the predicate must match before the actions of the antecedent are enacted. Chains of firewall rules are linear and serial, as the name implies.

Node—Could be any one of the nodes represented in FIG. 1. A Node can have any number of Services or Devices.

Service—Represents a node-specific or connection-specific behavior. A service may be a collection of atomic behaviors that are cohesive in their functionality and represent a larger piece of utility to the system. Any node or connection may have one or more services.

When a new device is introduced to the firewall system, a new Device object is created and placed in the Null node, which has no services (behaviors) and is not connected to any other node. The new device is then moved to the Node to which it belongs. A Device can be moved from one node to another. The process of "moving" a device from one node to another deletes existing behaviors and states and associates new ones.

When a device is deleted from the system, its Device object is moved to the Null node and then left to die (e.g., at object cleanup). In one implementation, a Java Virtual Machine provides garbage collection for null-ed firewall objects.

Connections between nodes, as represented in FIG. 1, are also created dynamically and can migrate or redefine their endpoints as the firewall system deems necessary.

Figure 3:
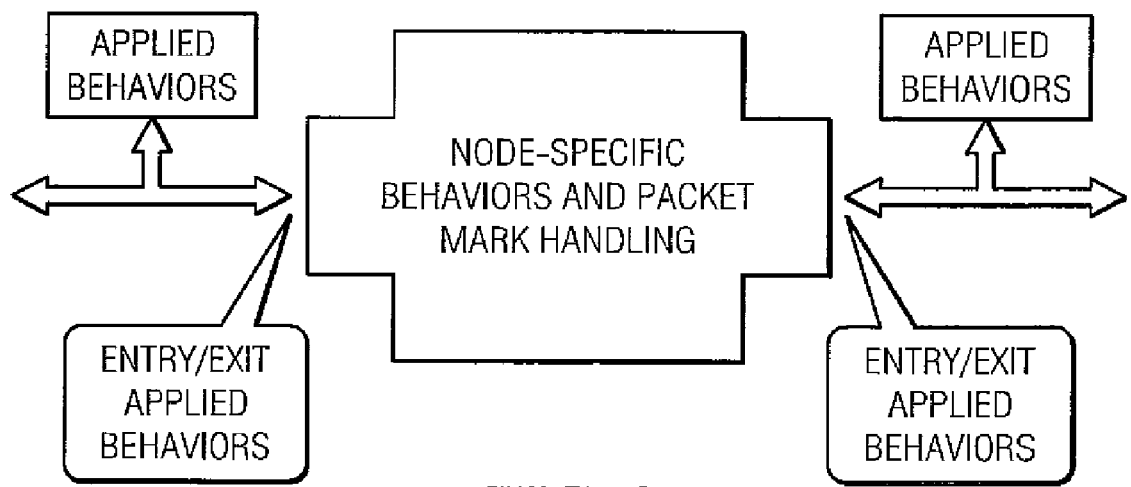
FIG. 3 illustrates aspects of behaviors applied to packet traversal through the firewall model.

One of the strengths of the firewall is its careful identification and segmentation of traffic flows. Each such flow is represented by the concept of a connection between nodes. Just as nodes have behaviors, so do connections. Some of the transformations applied to a packet depend entirely on the node through which the packet arrives or departs. Additional transformations can be associated with the connection through which the packet travels, without regard to the nodes between which the packet is traveling. FIG. 3 illustrates the salient aspects of behaviors applied to packet traversal through the firewall model. Thus, in a generic and customizable way, basic facilities can be adjusted by tailoring the specific behaviors of the various connections.

One important example of this is the connection between the Clients node and the WAN node. Packets that bear the mark of a client that is authorized to use the WAN connection are permitted to flow along this connection and arrive at the WAN node. Packets from clients that don't have this authorization are blocked. Network communications port blocking is typically a Client-specific behavior; i.e., in this embodiment's conceptual model, port blocking is germane only to network client device traffic and, hence, network port blocking is only considered when network client traffic is considered (i.e., traffic from the client node).

Network port forwarding is specific to the connection from the WAN node to the Clients node. In other words, packet processing is performed based on rules associated with the connection rather than the nodes. The nature of network port forwarding is that "outside" traffic—meaning, network traffic originating on the outside of the firewall, from the Wide-Area Network—will be addressed to a particular port as received by the firewall, whereupon the firewall will pass that network traffic, but may change the port as seen by the packet destination device.

Network Address Translation (NAT), is a WAN-specific behavior. NATed network packets have source and/or destination addresses translated to/from an internal network address that is not publicly available on the general network (or Internet). NATing is a mechanism for employing a single, public Internet Protocol Address (IPADDR) to represent a number of client devices behind a NATing service. NATed packets present a slightly different form of forwarding problem for firewalls, but it is akin to port forwarding or port translation, as the firewall must maintain a state table to keep track of NATed addresses or translated ports.

Every packet that arrives at the firewall receives a 32-bit mark (or other mark depending on implementation) that identifies how that packet is attributed. This is fundamental to accounting and authorization models, where network client traffic must be tracked. The firewall uses marks to, among other things, decide if packets are permitted to reach their destinations.

Figure 2A:
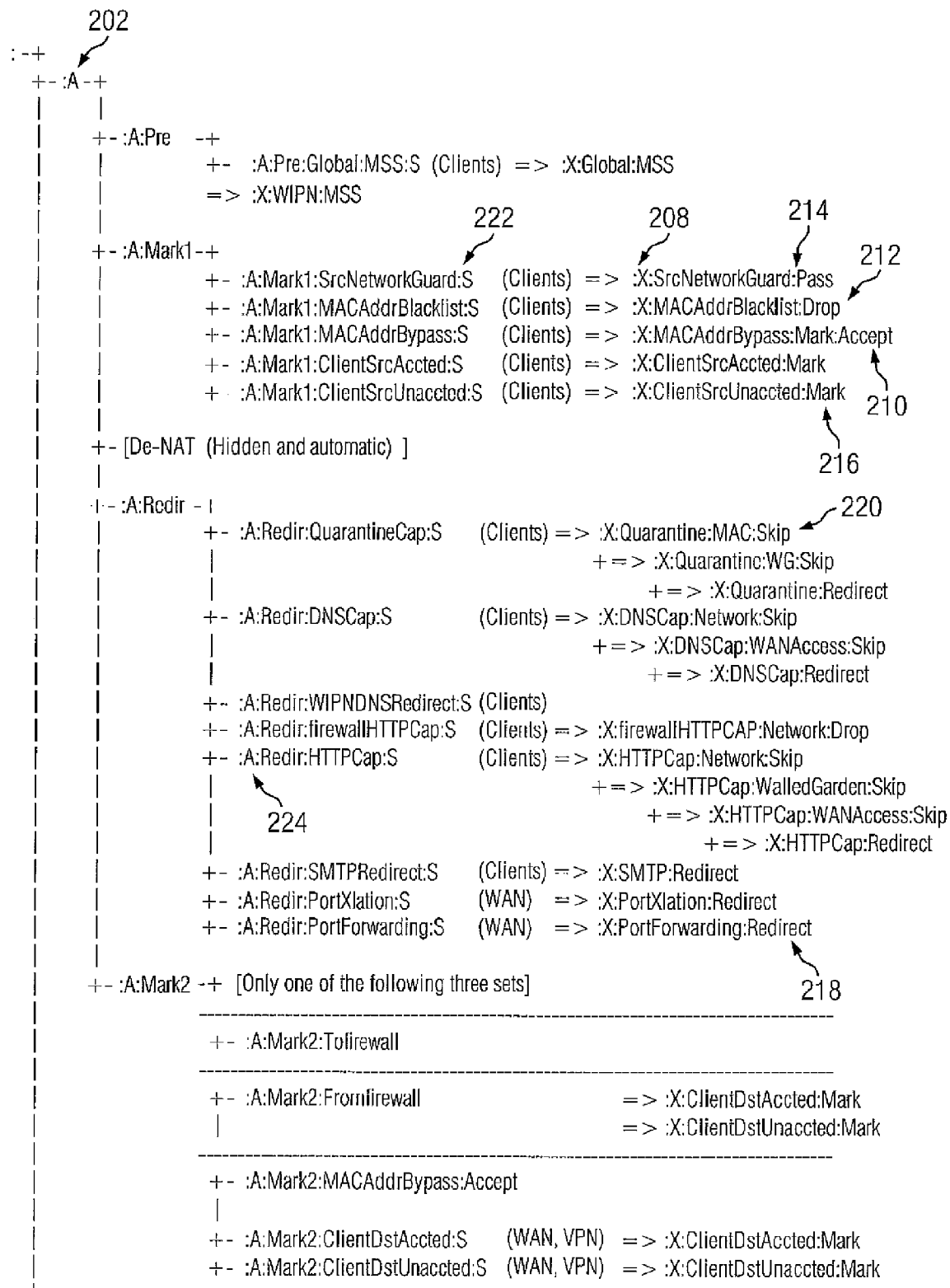
FIG. 2 illustrates a set of firewall rules.
Figure 2B:
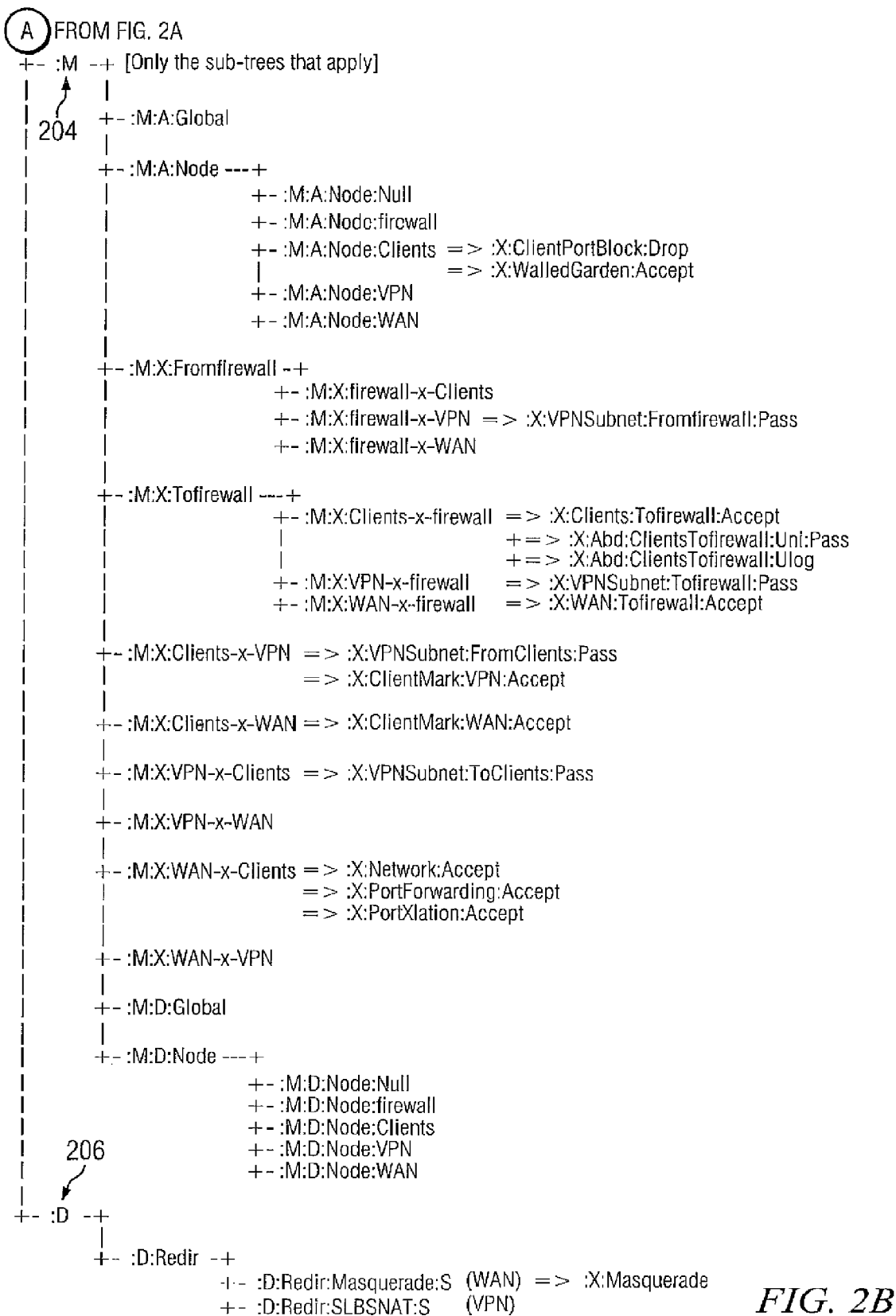

FIG. 2 illustrates the experience of a network packet as it travels through the firewall from its arriving node to its departing node. FIG. 2B is an extension of the tree graph of FIG. 2A as indicated. The path the tree graph takes is a depth-first, in-order traversal of the tree depicted in FIG. 2. In FIG. 2, the node (clients) corresponds to the defined nod LAN in FIG. 1.

To help reflect the structure of the firewall, rule chains are given names in a hierarchical name space. Immediately below the root are subtrees with names "A", "M", "D" and "X". These character identifiers provide a namespace separate for rules governing the firewalls behavior.

Rule chains essentially represent predicate/antecedent rule logic and can be classified as classic production rules systems as known in the Artificial Intelligence community. The tree nodes of a rule chain is a specific representation of a more general Boolean logic structure where each node in a chain tree that is traversed represented AND'd predicate logic in Boolean form. Additionally, exits from a rule chain (i.e., reaching leaf nodes) or jumps to other rule chains represent the antecedent portion of the rule.

Said differently, rule chains represent classic "If-Then" logic, as might be supported by the syntax of a software programming language.

FIG. 2 illustrates a representative set of firewall rules that handles NAT'd, MASQUERAD'd, VPN'd, port blocked, port forwarded and client authenticated traffic. While not an exhaustive list of firewall capabilities, these firewall functions are relatively standard and basic capabilities that can be found in most firewall implementations. These basic capabilities serve as an example from which to explain the dynamic firewall rule chain logic and are not meant to be an exhaustive or limiting list of capabilities. One main embodiment of this invention is the ability to dynamically extend, prune or otherwise modify these firewall rule chain sets as functional requirements or the network operating environment changes.

The arriving (:A) sub-tree (represented at 202) prepares packets to enter the matrix. This is where packets are marked, de-NATed (if Network Address Translation has occurred), de-MAQUERADEd and redirected. Since the purpose of this sub-tree is packet "conditioning", its rules only change network packets, and do not drop or accept them. Along with the :D sub-tree (see below), these rules implement the behaviors of nodes.

In the rule chain represented by 218, the antecedent portion of the :A rule chain redirects a network packet based on a port forwarding rule. Specifically, this rule (218) rewrites a portion of the network packet header, either changing the destination address or port, so that the packet arrives at an alternate location, once the packet departs the firewall, than originally addressed. In this example, the packet header contents are modified as a result of this :A rule chain.

In the :A rule chain represented by 224, a packets protocol is detected and "captured", before a determination is made as to where the packet may next proceed. This particular rule chain represents a common manner for capturing unauthorized network clients and either forcing them to authenticate themselves (usually against an authentication server like LDAP) or simply redirecting them to a constrained location on the network where their ability to view network resources is limited.

It is important to note, at this point, that the rule chains represented by FIG. 2 are composite rules chains of the entire firewall model and do not describe rule chains at any particular node or attached to any particular inter-node connection. For certain rules, especially those annotated as departing to or arriving from Clients or the WAN, there are likely logically constrained attachment points so that they work properly; e.g., A: chains dealing with incoming Client packets are likely attached to the LAN interface (logical, physical or virtual), since network Clients connect to a firewall via the LAN interface. Attachment points for other rule chains may be deferred to implementation details, based on the implementation technology or optimization requirements (speed, memory or cost).

In the matrix (:M) sub-tree (represented at 204), packets are routed through different chains depending on their source and destination nodes. The main purpose of this sub-tree is to decide if packets deserve to arrive at their destination, so the rules in this sub-tree only accept or drop packets, not change them. These rules implement the behaviors of the connections between nodes. More specifically, :M chains can be attached to the incoming/outgoing interfaces of nodes themselves, or attached to the inter-node connections.

The departing (:D) sub-tree (represented at 206), post-processes packets that have successfully navigated the matrix. Packets that arrive here deserve to be transmitted, so the rules in this sub-tree only change packets, not drop or accept them. This is where packets are NATed and MASQUERADEd. Along with the :A sub-tree, these rules implement the behaviors of nodes. :D chains are normally associated with nodes that have interfaces (logical, physical, virtual) with network segments outside of the firewall model.

The :X subtree contains chains that are compact, well-identified places where rules can be inserted and deleted dynamically. Packets arrive at these chains from well-identified "taps" in the main pathway. These taps are indicated throughout FIG. 2 by "=>" pointing at the name of the :X chain that will receive packets. This is shown, for example, at 208. :X chains exist for extensibility and may be provided, a priori, as part of the firewall implementation or may be dynamically loaded as part of a firewalls configuration or runtime reconfiguration.

In any tree structure, there are ultimately "leaves" of the tree, from which there are no child nodes. FIG. 2 demonstrates leaf chains, which have suffixes that indicate how they behave. ":Accept" chains, such as that represented at 210, have rules with ACCEPT targets. When a packet matches an ACCEPT target, the packet immediately jumps out of the current sub-tree, and moves to the next. Accept chains are useful for forming Boolean OR constructs. For example, the following series of rules might appear in a chain that needs to accept packets that match any of the tests "A", "B" or "C", each of which are implemented in their own chain. As an example, the "iptables" utility available from the Linux Operating System environment uses the following syntax to enable rules:

iptables -t filter -A ExampleChain -j TestA:Accept
iptables -t filter -A ExampleChain -j TestB:Accept
iptables -t filter -A ExampleChain -j TestC:Accept According to one embodiment, the default policy in the :M sub-tree is DROP. That is, if a packet traverses the entire :M sub-tree and never matches an ACCEPT target, it will be dropped.

":Drop" chains, such as that represented at 212, have rules with DROP targets. When a packet encounters a DROP target, it is discarded and will never be delivered to its destination.

":Pass" chains, such as that represented at 214, have rules with RETURN targets, and a single DROP target at the end. A RETURN target causes the packet to jump out of the current chain and resume its path through the "calling" chain. Each rule other than the final DROP describes a packets that should be "passed" on to further processing. Packets that match none of the RETURN rules encounter the DROP rule and are discarded. Since the DROP target in a pass chain must stay at the end of the chain, new rules, according to one embodiment, must be inserted, rather than appended.

Pass chains are useful for forming Boolean AND constructs. For example, the following series of rules might appear in a chain that needs to pass only packets that match all the tests "A", "B" and "C", each of which are implemented in their own chain. As an example, the "iptables" utility available from the Linux Operating System environment uses the following syntax to enable rules:

iptables -t filter -A ExampleChain -j TestA:Pass
iptables -t filter -A ExampleChain -j TestB:Pass
iptables -t filter -A ExampleChain -j TestC:Pass ":Mark" chains, such as that represented at 216, have rules with MARK targets. These rules write packet marks according to various criteria. These chains appear only in the :A sub-tree because packets must be accounted for as soon as they arrive.

":Redirect" chains, like that shown at 218, have rules with REDIRECT targets. These rules usually change a packet's destination address and/or port.

":Skip" chains (e.g., shown at 220) are like pass chains, these chains have rules with RETURN targets. Unlike pass chains, skip chains have something other than a DROP target at the end. Each rule other than the final one describes packets that should skip whatever processing the final rule offers. Packets that match none of the RETURN rules are processed by the final rule. Since the final rule must stay at the end of the chain, new rules, according to one embodiment, must be inserted, rather than appended.

":S (:J)" chains are "services" (described below). The names of nodes that subscribe to a service are shown in parentheses after the chain. For each :S chain (e.g., shown at 222), there is a :J chain that is not shown.

A "service" is a set of rules that operate on packets in a very specific way (e.g., masquerading outgoing packets, or capturing incoming packets). Every service has two chains. The first chain has a name ending with :S. This chain appears in the packet pathway in a specific place and is guaranteed to see all packets flowing through the firewall. The second chain has a name ending with :J and contains the rules that actually implement the service. Packets that need the service are directed through the second chain by a "jumper" in the first chain. This is analogous to a hardware jumper used to enable a feature.

For example, HTTP requests arriving from the Clients node must be captured if the given client is not authorized. Thus, the :A:Redir:HTTPCap:S (shown at 224) can contain a rule that causes packets coming from eth0 to the :A:Redir:HTTPCap:J chain. The rules in the :A:Redir:HTTPCap:J chain arrange for the capture of unauthorized packets.

One example of Mark Space Allocation employs a 32-bit number that travels with the packet when it's in the system—it is lost as soon as the packet enters a device. Marks can be read and written by rules in the firewall. They can also be read (but not written) by the routing and bandwidth control systems. Thus, firewall rules can be used to control how packets are routed and scheduled for transmission.

It can be noted from FIG. 2 that rules can be applied to nodes or connections between nodes. For example, rule 208 is applied to the node "clients" (represented by the (clients) in the rule). A rule associated with the clients node will be applied to packets to/from devices or services associated with the clients node in the firewall model. Rules can also be associated with connections. For example, for the chain shown in FIG. 2B:

M:X:WAN-x-Clients
    =>:X:Network:Accept
    =>:X:PortForwarding:Accept
    =>:X:PortXlation:Accept The rules are applied to packets flowing on the connection between the WAN node and the clients node.

When a packet arrives at the firewall, it is automatically assigned a mark of zero (the "unmarked" mark). As quickly as possible, the firewall attempts to assign a mark that attributes the packet to whichever party is best accountable for it. This is important for two reasons:

It tells the firewall, bandwidth control and routing systems how to treat a packet. For example, priority channel packets are passed immediately by the firewall, and then transmitted by the bandwidth control system as soon as they arrive. Packets with client marks are passed conditionally, depending on whether or not the owning client has the proper authorization, and then scheduled for transmission by the bandwidth control system in accordance with the client's provisioning.

It also tells the firewall how to account for a packet. In order for the firewall to send proper accounting reports, it must be able to match a packet to a client or other accounting entity. When the firewall marks a packet, it enables the firewall to do this.

The table below shows one embodiment of how the mark name space is allocated:

| Mark (hex) | Description |
|---|---|
| 0000 | Unmarked |
| 0001-0fff | RESERVED |
| 1xxx | System traffic marks (4K marks) |
| 1000 | Unattributed |
| 1001 | firewall |
| 1002 | VPN |
| 1003-1fff | RESERVED |
| 2xxx | Static clients (4K marks) |
| 3xxx | Dynamic clients (4K marks) |
| 4000-fffe | Per-IP Bandwidth Control |
| ffff | MAC address bypass |

The mark ranges are in order of numerical value, but are also in order of "mark priority". For example, a dynamic client mark has a higher priority than the firewall mark. This is why a packet traveling from a client to the firewall merits both marks, but will receive the client's mark. Notice that the priority channel has the highest priority mark. This means that packets from a client that travels over the priority channel will be attributed to the priority channel—not the client from which it came.

All packets get "0x0000" mark automatically when they enter the firewall. A packet will receive a more informative mark if it can be attributed. These packets have limited permission to travel through the firewall and are very susceptible to being captured.

The "0x1xxx" range (where xxx is a 3-digit hexadecimal range from 000 to fff) is used to mark packets that cannot be specifically attributed with a higher mark, but can be identified by the node to/from which they are traveling. Currently, there are only two marks in this range: firewall and VPN. There is no Clients mark because all packets traveling to/from the Clients node are given the appropriate client mark. There is no WAN mark because all packets traveling to/from the WAN node are given other marks.

An important use for this range is exemplified by the VPN mark. When packets depart through the ipsec0 pseudo-device, they generate new packets that emerge from the firewall and leave through the physical eth1 device. Thus, tunneled VPN traffic competes with clients and other elements of the system to consume bandwidth on the eth1 device. For that reason, these packets must be marked so they can be accounted for.

According to one embodiment, new nodes can be dynamically generated for new pseudo-devices that, like the VPN, will generate packets that must flow out through a physical device. Each such node will be allocated a mark from this range. :D rule chains implement packet handling for pseudo devices as the packets depart the firewall.

Packets receive the "0x1000" firewall mark if they are arriving from or destined for the firewall and do not already have a higher-priority mark.

Packets receive the "0x1001" VPN mark if they are carrying tunnel traffic for a VPN node.

Marks for static clients are allocated from the "0x2xxx" range (where xxx is the hexadecimal range 000 to fff). Notice that this is a lower priority range than dynamic clients. That is, if a packet merits both a static and dynamic client mark, it will receive the dynamic client mark.

Marks for dynamic clients are allocated from range 0x3xxx, where xxx is the hexadecimal range 000 to fff.

The "0xfxxx" range is used to mark packets belong to various unaccounted categories.

The mark "0xf000" applies to packets that qualify for MAC Address Bypass.

The "0xffff" mark applies to packets in the priority channel.

Packets departing from the router node receive marks in this order:

Apply a client's mark to packets departing through a device owned by the client.

Apply a client's mark to packets with a destination IP address owned by the client.

For any packets that don't yet have a mark:

Apply the VPN mark to unmarked IPv6-Crypt protocol packets.

Apply the firewall mark to unmarked packets.

If the packet can be attributed to a network client, it will be. Otherwise, it will be attributed to the firewall. Since the firewall doesn't participate in VPN tunnels with clients, the VPN mark will never apply.

VPN tunnel traffic will be IPv6-Crypt protocol, and will receive the VPN mark. All other traffic will receive the firewall mark.

Packets destined for the router node receive additional marks in this order:

Apply the VPN mark to unmarked IPv6-Crypt protocol packets.

Apply the firewall mark to unmarked packets.

Packets arriving from the Clients node receive marks in this order:

Apply a client's mark to packets arriving from a device owned by the client.

Apply a client's mark to packets with a source IP address owned by the client.

Apply the MAC address bypass mark to qualifying packets.

Apply the priority channel mark to qualifying packets.

Apply additional marks in this order:

Apply the VPN mark to unmarked IPv6-Crypt protocol packets.

Apply the firewall mark to unmarked packets.

Packets arriving from the VPN node receive marks in this order:

Apply a client's mark to packets departing through a device owned by the client.

Apply a client's mark to packets with a destination IP address owned by the client.

Apply additional marks in this order:

Apply the VPN mark to unmarked IPv6-Crypt protocol packets.

Apply the firewall mark to unmarked packets.

Client marks, according to one embodiment of the present invention, will never apply to this traffic. Tunnel within tunnel traffic will receive the VPN mark, just like tunnel traffic through the WAN node. All remaining traffic will receive the firewall mark.

Packets arriving from the WAN node receive marks in this order:

Apply a client's mark to packets departing through a device owned by the client.

Apply a client's mark to packets with a destination IP address owned by the client.

Apply additional marks in this order:

Apply the VPN mark to unmarked IPv6-Crypt protocol packets.

Apply the firewall mark to unmarked packets.

According to one embodiment, client marks will never apply to this traffic. Tunnel traffic will receive the VPN mark. All remaining traffic will receive the firewall mark.

If the packet can be attributed to a client, it will be. Otherwise, it will be unmarked. Note that port forwarded and port translated traffic that is not directed at a specific client will be unmarked. One way to insure that this traffic is marked and accounted for would be to set up a static client.

One embodiment of the present invention includes a conceptual model representing a network firewall that separates firewall functionality into individually configurable and controllable components.

Another embodiment of the present invention includes the conceptual model, wherein the hardware or component technology used to host a firewall model's implementation is indistinct from commercial off-the-shelf components and, therefore, the firewall is driven by a dynamically reconfigurable implementation of the firewall model. A non-limiting example of a dynamically reconfigurable implementation of the firewall model can be realized through a computer program product comprising a computer readable storage medium storing computer program code executable by a computer. One of ordinary skill in the art can appreciate that many suitable computer readable storage media exist.

Yet another embodiment of the present invention includes a conceptual model, where a set of firewalls can be dynamically reconfigurable and managed as a cohesive group of firewall nodes in a network implementation comprised of several LAN and WAN segments needing firewall protection. In a system of firewalls, each protecting a separate network segment, system-wide policies can be implemented by downloading identical sets of rule chains to each firewall, as a representation of common firewall configurations. It may also be desirable to "clone-n-hone" firewall configurations, which occurs with a common rule chain configuration is provided to each firewall in a system of firewalls and individual firewalls receive localized customizations, tailoring their behavior to the needs of a particular network segment. Localized rule chain modifications make it possible to extend/modify an individual firewall's behavior, based on a general behavior policy.

According to one embodiment of the present invention, the firewall behaviors are described as predicate/antecedent rule logic acting upon dynamic data from both the configuration space of the firewall as well as changing network state and client connectivity. The rule chain predicates ("If" portions of a rule) act on data that is potentially available from multiple sources:

Configuration data of the firewall (e.g., it's Internet Protocol Address, it's local identification string, the version of the firewall rule chain set, etc.)

Data arriving in the network packet itself (e.g., the origination or destination address, the protocol, portions of the payload data, etc.)

Data available through firewall extensions (:X rule chains) that may be monitoring network traffic flows for activity spikes or lulls or, perhaps, a device monitoring extension that polls a timer or instrumentation device for time-sensitive data.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A method for controlling data flow through a firewall comprising:

establishing a firewall model for the firewall, wherein the firewall model defines nodes, connections between the nodes, and a set of firewall rules applicable to the nodes, the connections between the nodes, or a combination thereof, wherein each of the nodes represents simultaneously a source and a destination for data packets, and wherein the set of firewall rules comprise a tree graph with an arriving sub-tree having one or more rule chains for conditioning the data packets without accepting or dropping the data packets, a matrix sub-tree having one or more rule chains for accepting or dropping in the data packets without changing the data packets, and an extensible sub-tree having one or more rule chains for providing dynamic extensibility to the firewall rules;

implementing the firewall within one or more machines connected to network segments where the nodes reside;

receiving a packet at an arriving node, wherein the arriving node is one of the nodes defined by the firewall model;

conditioning the packet based on rules in the one or more rule chains in the arriving sub-tree that are associated with the arriving node; and accepting or dropping the packet based on rules in the one or more rule chains in the matrix sub-tree that are associated with the arriving node, an inter-node connection, or a combination thereof, wherein the inter-node connection is one of the connections defined by the firewall model.

2. The method of claim 1, wherein each of the nodes comprises at least a service defined by the firewall, at least a device defined by the firewall, or a combination thereof.

3. The method of claim 1, wherein the firewall rules further comprise a departing sub-tree having one or more rule chains for post-processing the data packets at their destination node or nodes.

4. The method of claim 1, wherein the rules in the one or more rule chains in the arriving sub-tree that are associated with the arriving node implement behaviors of the arriving node.

5. The method of claim 1, wherein the rules in the one or more rule chains in the matrix sub-tree that are associated with the inter-node connection implement behaviors of the inter-node connection.

6. The method of claim 1, further comprising reconfiguring the firewall while the firewall is executing on the one or more machines to account for a functional requirement or a network operating environment change.

7. The method of claim 6, wherein reconfiguring the firewall comprises extending, pruning, or modifying one or more serialized sequences of the firewall rules while the firewall is executing on the one or more machines.

8. The method of claim 7, wherein extending a serialized sequence comprises inserting one or more firewall rules while the firewall is executing on the one or more machines.

9. The method of claim 7, wherein pruning a serialized sequence comprises deleting one or more firewall rules while the firewall is executing on the one or more machines.

10. A computer program product comprising a computer readable storage medium storing computer executable instructions for:

establishing a firewall model for a firewall, wherein the firewall model defines nodes, connections between the nodes, and a set of firewall rules applicable to the nodes, the connections between the nodes, or a combination thereof, wherein each of the nodes represents simultaneously a source and a destination for data packets, and wherein the set of firewall rules comprise a tree graph with an arriving sub-tree having one or more rule chains for conditioning the data packets without accepting or dropping the data packets, a matrix sub-tree having one or more rule chains for accepting or dropping the data packets without changing the data packets, and an extensible sub-tree having one or more rule chains for providing dynamic extensibility to the firewall rules; and implementing the firewall within one or more machines connected to network segments where the nodes reside, wherein when a packet arrives at one of the nodes, the packet is conditioned based on rules in the one or more rule chains in the arriving sub-tree that are associated with the node, and wherein the packet is accepted or dropped based on rules in the one or more rule chains in the matrix sub-tree that are associated with the node, the inter-node connection, or a combination thereof wherein the inter-node connection is one of the connections defined by the firewall model.

11. The computer program product of claim 10, wherein each of the nodes comprises at least a service defined by the firewall, at least a device defined by the firewall, or a combination thereof.

12. The computer program product of claim 10, wherein the firewall rules further comprise a departing sub-tree having one or more rule chains for post-processing the data packets at their destination node or nodes.

13. The computer program product of claim 10, wherein the computer readable storage medium farther stores computer executable instructions for reconfiguring the firewall while the firewall is executing on the one or more machines to account for a functional requirement or a network operating environment change.

14. The computer program product of claim 13, wherein reconfiguring the firewall comprises extending, pruning, or modifying one or more serialized sequences of the firewall rules while the firewall is executing on the one or more machines.

15. The computer program product of claim 13, wherein a node comprises one or more devices, one or more services, or a combination thereof, wherein a device represents a source or sink of network traffic, wherein the device is mapped to a physical device or network interface, or to a virtual device, wherein a service represents a node-specific or connection-specific behavior, and wherein the network operating environment change comprises moving one or more devices, one or more services, or a combination thereof from one node to another.

16. A system for controlling data flow through a firewall, comprising:

at least one processor; and a computer readable storage medium accessible by the at least one processor and storing computer instructions executable by the at least one processor for:

establishing a firewall model for a firewall, wherein the firewall model defines nodes, connections between the nodes, and a set of firewall rules applicable to the nodes, the connections between the nodes, or a combination thereof, wherein each of the nodes represents simultaneously a source and a destination for data packets, and wherein the set of firewall rules comprise a tree graph with an arriving sub-tree having one or more rule chains for conditioning the data packets without accepting or dropping the data packets, a matrix sub-tree having one or more rule chains for accepting or dropping the data packets without changing the data packets, and an extensible sub-tree having one or more rule chains for providing dynamic extensibility to the firewall rules; and implementing the firewall within one or more machines connected to network segments where the nodes reside, wherein when a packet arrives at one of the nodes, the packet is conditioned based on rules in the one or more rule chains in the arriving sub-tree that are associated with the node, and wherein the packet is accepted or dropped based on rules in the one or more rule chains in the matrix sub-tree that are associated with the node, the inter-node connection, or a combination thereof, wherein the inter-node connection is one of the connections defined by the firewall model.

17. The system of claim 16, wherein the rules in the one or more rule chains in the arriving sub-tree that are associated with the node implement behaviors of the node.

18. The system of claim 16, wherein the rules in the one or more rule chains in the matrix sub-tree that are associated with the inter-node connection implement behaviors of the inter-node connection.

19. The system of claim 16, wherein the computer readable storage medium further stores computer instructions executable by the at least one processor for reconfiguring the firewall while the firewall is executing on the one or more machines to account for a functional requirement or a network operating environment change.

20. The system of claim 19, wherein a node comprises one or more devices, one or more services, or a combination thereof, wherein a device represents a source or sink of network traffic, wherein the device is mapped to a physical device or network interface, or to a virtual device, wherein a service represents a node-specific or connection-specific behavior, and wherein the network operating environment change comprises moving one or more devices, one or more services, or a combination thereof from one node to another.

* * * * *